(12) United States Patent
Chen et al.

(10) Patent No.: US 12,524,715 B2
(45) Date of Patent: Jan. 13, 2026

(54) WAIT TIME PREDICTION

(71) Applicant: Google LLC, Mountain View, CA (US)

(72) Inventors: Li-Sue Chen, San Jose, CA (US); Steve Chien, San Carlos, CA (US); Quang Duong, San Francisco, CA (US); Tong Wang, San Francisco, CA (US); Xixi Wang, Cupertino, CA (US); Ke Xu, Newark, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/378,399

(22) Filed: Oct. 10, 2023

(65) Prior Publication Data
US 2024/0127136 A1 Apr. 18, 2024

Related U.S. Application Data

(63) Continuation of application No. 15/800,787, filed on Nov. 1, 2017, now abandoned.

(51) Int. Cl.
| | | |
|---|---|---|
| G06Q 10/06 | (2023.01) | |
| G06F 17/18 | (2006.01) | |
| G06N 5/04 | (2023.01) | |
| G06Q 10/04 | (2023.01) | |
| G06Q 10/0631 | (2023.01) | |
| G06Q 10/109 | (2023.01) | |
| G06Q 30/0201 | (2023.01) | |
| G06Q 30/0202 | (2023.01) | |

(52) U.S. Cl.
CPC ......... *G06Q 10/0631* (2013.01); *G06F 17/18* (2013.01); *G06N 5/04* (2013.01); *G06Q 10/04* (2013.01); *G06Q 10/109* (2013.01); *G06Q 30/0201* (2013.01); *G06Q 30/0202* (2013.01)

(58) Field of Classification Search
CPC .................................................. G06Q 10/06
See application file for complete search history.

(56) References Cited

U.S. PATENT DOCUMENTS

| | | |
|---|---|---|
| 5,506,898 A | 4/1996 | Costantini et al. |
| 6,754,333 B1 | 6/2004 | Flockhart et al. |

(Continued)

FOREIGN PATENT DOCUMENTS

| | | | |
|---|---|---|---|
| EP | 3104316 A1 | 12/2016 | |
| WO | WO-2007090133 A2 * | 8/2007 | ............. G06Q 30/02 |

OTHER PUBLICATIONS

Rouba Ibrahim and Ward Whitt, Wait-Time Predictors for Customer Service Systems with Time-Varying Demand and Capacity, Operations Research, vol. 59, No. 5, Sep.-Oct. 2011. (Year: 2011).*

(Continued)

*Primary Examiner* — Kurtis Gills
(74) *Attorney, Agent, or Firm* — Lerner David LLP

(57) ABSTRACT

The wait time prediction technology determines expected wait times for businesses or other public services using a model generated based on at least historical wait times for the business. In response to a request from a user, an expected wait time for service at the business for at least one particular time period on a particular day of a week is determined using the model and provided for display. User feedback regarding the expected wait time may be requested, and used to refresh the model as new wait times and other information are collected.

20 Claims, 7 Drawing Sheets

(56) References Cited

U.S. PATENT DOCUMENTS

| | | | |
|---|---|---|---|
| 7,756,745 | B2 | 7/2010 | Leet et al. |
| 7,778,937 | B2 | 8/2010 | Ferrara et al. |
| 9,456,309 | B2 | 9/2016 | Zises |
| 2008/0267107 | A1 | 10/2008 | Rosenberg |
| 2014/0180848 | A1* | 6/2014 | Argue .................. G07G 1/01 705/16 |
| 2015/0081348 | A1* | 3/2015 | Avera .................. G06Q 10/02 705/14.66 |
| 2015/0088562 | A1* | 3/2015 | Woods .................. G06Q 50/12 705/5 |
| 2015/0088671 | A1* | 3/2015 | Xiong .................. G06Q 50/12 705/15 |
| 2016/0021507 | A1 | 1/2016 | Gaines |
| 2016/0321548 | A1 | 11/2016 | Ziskind et al. |
| 2017/0039661 | A1* | 2/2017 | Vanslette ............. G06Q 10/20 |
| 2017/0046800 | A1* | 2/2017 | Zomet ................. G06Q 50/12 |
| 2017/0169413 | A1* | 6/2017 | Holmes ............... G06Q 20/405 |

OTHER PUBLICATIONS

"Airport Wait Times" [online], [Retrieved Oct. 13, 2017 ] Retrieved from the internet: https://awt.cbp.gov/, 1 page.

Rouba Ibrahim and Ward Whitt, Wait-Time Predictors for Customer Service Systems with Time-Varying Demand and Capacity, Operations Research, vol. 59, No. 5, Sep.-Oct. 2011, pp. 1106-1118.

Oleg S. Pianykh and Daniel I. Rosenthal, Can We Predict Patient Wait Time, Journal of the American College of Radiology, Oct. 2015, [Retrieved Nov. 1, 2017 ] Retrieved from the internet: http://www.jacr.org/article/S1546-1440 (15)00262-8/abstract, Abstract Only, 2 pages.

Taku Fujiyama and Bolun Cao, Lengths of time passengers spend at railway termini: An analysis using smart card data, Intelligent Rail Transportation (ICIRT), 2016 IEEE International Conference, Aug. 23-25, 2016, [Retrieved Oct. 13, 2017 ] Retrieved from the internet: http://ieeexplore.ieee.org/document/7588723/?part=1, Abstract Only, 3 pages.

Larry A. Bowman and Mark A. Turnquist, Service frequency, schedule reliability and passenger wait times at transit stops, Transportation Research, Nov. 1981, [Retrieved Nov. 1, 2017 ] Retrieved from the internet: https://www.sciencedirect.com/science/article/pii/019126078190114X, Abstract Only, 3 pages.

Watkins, Kari Edison et al., Where Is My Bus? Impact of mobile real-time information on the perceived and actual wait time of transit riders, Transportation Research, Oct. 2011, [Retrieved Nov. 1, 2017 ] Retrieved from the internet: http://www.sciencedirect.com/science/article/pii/S0965856411001030, Abstract Only, 4 pages.

* cited by examiner

WAIT TIME PREDICTION

BACKGROUND

In making everyday decisions, it is often helpful to know how busy a business or public service establishment is before planning a visit. For example, the DMV website shows wait time information at each of their offices. Certain hospitals and emergency rooms also publish their wait time information. Most establishments, however, do not collect or publish wait time information.

Currently, some websites can indicate how busy any of a variety of businesses or public establishments typically is at various times of the week or in real-time. However, this only provides measurements of a number of people at the establishments at a given time.

BRIEF SUMMARY

The present disclosure provides for receiving data related to a business, the data including at least historical wait time information, generating a model using one or more computing devices based on at least the historical wait time information for the business, determining an expected wait time for service at the business for at least one particular time period on a particular day of a week using the model, receiving a request for information about a business, and providing for display, in response to the request, the expected wait time. The present disclosure may further include requesting user feedback regarding the expected wait time, and refreshing the model as new wait times and other information are received.

Generating the model may include using other types of data in addition to historical wait times, such as place attributes, i.e., particular attributes about a business. Generating the model may also include using historical temporal signals, collected over a look-back window, that fluctuate throughout a day and throughout a week. The historical temporal signals may be further analyzed to derive useful statistics that can also be used in generating the model. The model generated may be a regression model or a classification model, and may further be a linear model, a boosting tree model, a random forest model, or a neural net model.

Determining the expected wait time may include determining an upper bound expected wait time. Determining the expected wait time may further include determining whether the expected wait time is less than a predetermined significant-wait threshold. Determining the expected wait time may further include computing a maximum expected wait time for the particular day of the week, and determining at least one peak interval for the particular day of the week having the maximum expected wait time. Determining the expected wait time may also include smoothing the expected wait time data by taking weighted averages with expected wait times of the neighboring time periods.

Providing for display may further include displaying the time period as a no-wait time period if the expected wait time is less than the significant threshold. Providing for display may also include displaying the maximum expected wait time of the particular day of the week and the corresponding peak interval. Providing for display may yet include displaying in association with other business information indicating busyness level.

The disclosure further provides a system, comprising a memory and one or more processors in communication with the memory. The one or more processors are configured to receive data related to a business, the data including at least historical wait time information, generate a model using one or more computing devices based on at least the historical wait time information for the business, determine an expected wait time for service at the business for at least one particular time period on a particular day of a week using the model, receive a request for information about a business, and provide for display, in response to the request, the expected wait time.

The disclosure yet further provides a computer-readable storage medium storing instructions executable by one or more processors for performing a method, comprising receiving data related to a business, the data including at least historical wait time information, generating a model using one or more computing devices based on at least the historical wait time information for the business, determining an expected wait time for service at the business for at least one particular time period on a particular day of a week using the model, receiving a request for information about a business, and providing for display, in response to the request, the expected wait time.

DETAILED DESCRIPTION

Overview

Figure 1:
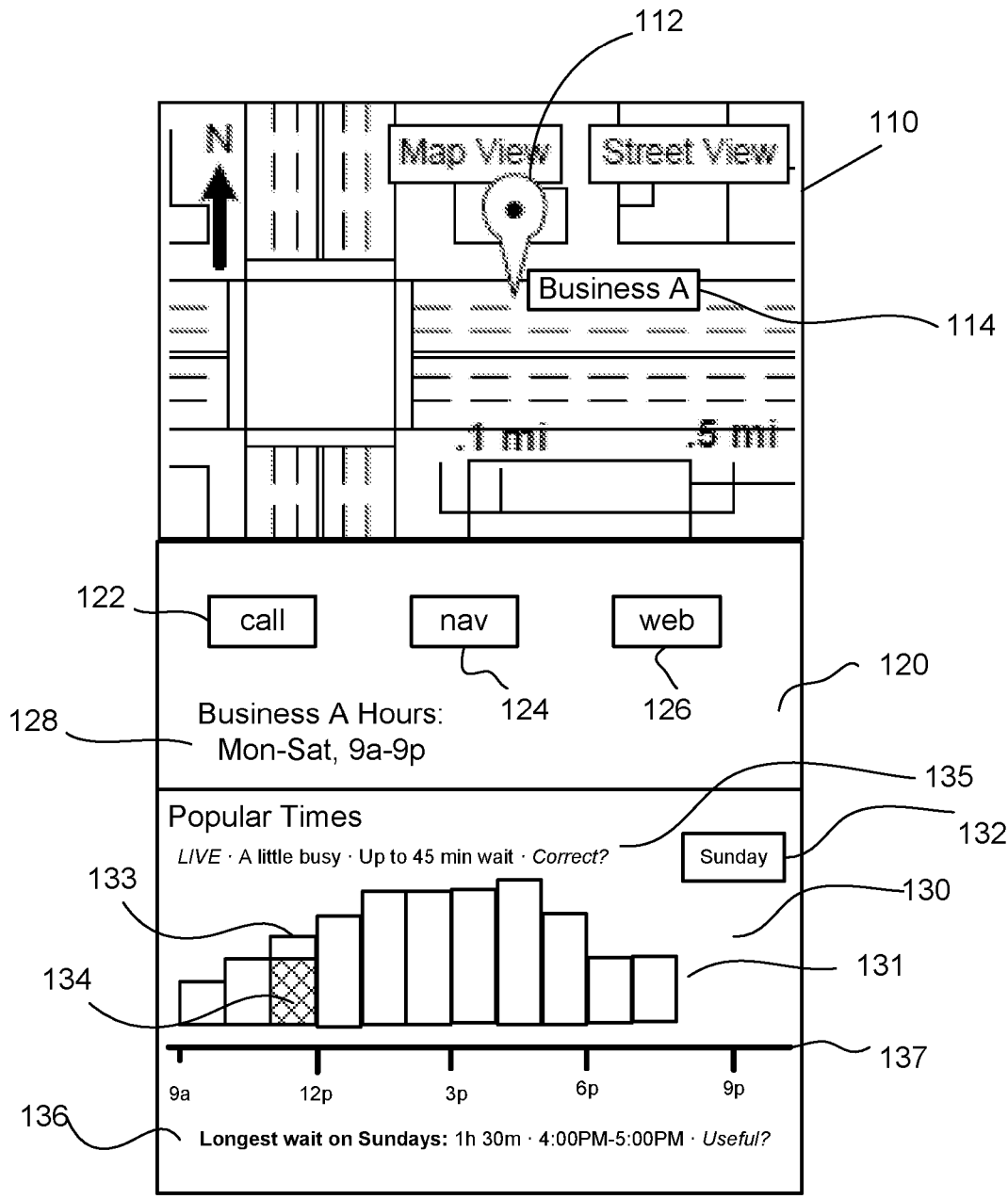
FIG. 1 illustrates an example of how expected wait time information may be displayed according to aspects of the disclosure.

The technology relates generally to predicting and displaying wait times likely to be experienced by users visiting a business or a public service establishment. The technology assists users in making everyday decisions, for example, which grocery store to stop by in the next 30 min; which restaurants nearby have a short wait time for dinner around 7 pm tomorrow; when would be the best time to try that very popular restaurant in town to avoid a very long wait?

The expected wait time information may be provided for display. For example, map information related to the business is provided, along with other information corresponding to the business. Examples of such other information include a phone number, directions, website, operating hours, etc. Example of other related information may include a graph showing how popular the business is at various times of a day on various days of a week, relative to the typical peak popularity for the business for the week ("popular times"). The current expected wait time may be provided for display. In addition, the expected wait time for each time period may be overlaid with the popular times graph. The maximum expected wait time for a particular day may be provided for display, along with peak intervals that correspond to the maximum wait time.

The wait time prediction technology described herein builds a model based on historical wait times collected from users. As more new wait times are collected, the model may be refined or refreshed. This allows the model to be fine-tuned over time. For example, as more data points are collected, the impact of outliers will be reduced. As another example, new data points can also show certain changes in the wait time patterns for a business (e.g., maybe a place is gaining popularity).

The wait time prediction technology may additionally use other types of data in building and refining the model, such as place attributes, i.e., particular attributes about a business. For example, wait time patterns are likely very different for a restaurant as compared to a hospital on a weekend, for a grocery store as compared to a department store on a weekday, or for a fine dining restaurant as compared to a fast food restaurant during lunch hours. Therefore, place category may be play an important role in the wait time pattern. Another important place attribute is whether the business accepts or recommends making a reservation. Yet another place attribute that may play a role in the wait time pattern is the popularity of the business, for example, as reflected by user ratings and comments. Other place attributes, such as online search and visit statistics, may also play a role in the wait time patterns and therefore used in building the prediction model.

In addition to the general attributes about the place exemplified above, the wait time prediction technology may further use historical temporal signals that fluctuate throughout a day and throughout a week to build and refine the prediction model. For example, visit data such as the number of arrivals, the number of departures, the occupancy level, and the duration of visits at a particular time period and a particular day of the week can be collected for a predetermined look-back window and used to predict patterns. Other examples include online visits and searches that fluctuate depending on the time of the day and the day of the week.

The historical temporal signals described above may be further analyzed over a part of or the entire look-back window to derive useful statistics that can further help predicting wait times at a business, such derived temporal signals may also be used to build and refine the wait time prediction model. For example, a maximum, a minimum, a mean, and a sum of the number of arrivals at a particular time period on a particular day of a week for a business may be computed over half of the look-back window. As another example, aggregated data such as the $90^{th}$ percentile visit duration at a particular time period on a particular day of a week for a business can be computed over the entire look-back window.

As yet another example, lag variables of each of the historical temporal signals and derived temporal signals described above can be determined. The lag variable may be backward-looking or forward-looking. For example, one interesting backward-looking lag variable may be the number of arrivals in the time period preceding the time period for which an expected wait time is to be predicted, since these recent arrivals are likely to remain for more than one time period. As another example, one interesting forward-looking lag variable may be the occupancy level in the upcoming time period following the time period for which an expected wait time is to be predicted. For instance, if the following hour corresponds to the end of lunch break for many employees in the area, a large number of departures may be expected in the upcoming hour, and therefore the business will soon be able to absorb more customers in the upcoming hour.

Various types of models may be generated. The model may be, for example, a regression model or a classification model. The model may be a linear model, a boosting tree model, a random forest model, or a neural net model. In one example, a quantile regression model is used to determine an upper bound wait time for the given time period. For example, the $90^{th}$ percentile expected wait time. A deep neural network with a custom loss function may be used to implement the quantile regression model.

The expected wait time may be determined and expressed as an upper bound wait time. For example, "up to 30 min wait" is displayed to the user. The expected wait time may be rounded to a predetermined granularity for display, e.g., instead of "14 min wait" and "36 min wait," the users will see "15 min wait" and "30 min wait." In one example, before the expected wait time is displayed to the user, the wait time is smoothed by taking a weighted average of the expected wait time and at least one other expected wait time from a neighboring time period.

In many cases, a certain threshold of wait time is almost always expected for a category of businesses. For example, a person walking into almost any sit-down restaurant could expect at least a trivial wait to be seated, say, 10 min. Thus, it would not be interesting for a user to see such trivial wait times. Therefore, in one example, if for a given time period, the expected wait time is less than a predetermined significant-wait threshold, then "usually no wait" may be displayed for the given time period.

In another example, the wait time prediction technology determines and displays a maximum expected wait time for the day. In addition, the peak interval including all the time periods that correspond to the maximum expected wait time may be displayed. For example, "longest wait time today•60 min•12:30 pm-2 pm, 5:00 pm-7:30 pm." If the expected wait time is less than the predetermined significant-wait threshold for all time periods of a day, then "usually no wait" may be displayed instead of the maximum expected wait time.

In another example, feedback is requested from the same user who requested the wait time information. The user can, for example, provide feedback about the accuracy of the expected wait time, input a new wait time actually experienced by the user, or provide additional information about the business or about the user's visit. Such information may be used to refine and refresh the wait time prediction technology.

The wait time prediction technology described herein is advantageous in a number of ways. For example, because a larger amount of historical data can be collected as compared to requesting users currently visiting a business for real-time data, the predicted wait times will be less affected by outliers and more indicative of a trend. Further, because the wait time prediction model can be refined and refreshed with newly collected data, the wait time prediction technology can be updated to reflect a recent change in trend. The data used to build the wait time prediction model may be large in volume, but the users are presented with useful information that is simple to understand. Therefore, after a quick glance, users will be aided in their decision making.

Example Systems

FIG. 1 illustrates an example of how the expected wait time information may be displayed. In this example, graphic 100 includes a map section 110, an informational section 120, and a popular times section 130. The graphic 100 may be displayed, for example on a client device, in response to a request for information related to Business A. The request for information may include, for example, an address, business name, general geographical area, type of business, etc.

The map section 110 may include a depiction of geographical objects at a particular geographic location. For example, the geographic objects may include roads, buildings, landmarks, statues, street signs, etc. The objects may be depicted in, for example, a roadgraph, aerial imagery, street level imagery, or the like. The map section 110 may also depict a marker 112 corresponding to a requested location, such as Business A. The marker identifies where the requested location is located with respect to other objects depicted in the map section. The marker may be depicted in any of a variety of shapes and forms. Further, a label 114 may identify that the marker 112 corresponds to Business A. Though not shown, in some examples the marker or map near the marker may be depicted so as to indicate a current expected wait time at Business A. For example, a size, shape, shading, or other aspect of the marker or map may change if the current expected time is short or long. As another example, additional icons may be positioned near the map near the marker to indicate current expected wait time. It should be understood that these are merely examples, and any of a number of indicators may be used.

Informational section 120 provides further information related to Business A. Such information may include user input controls 122, 124, 126, enabling the user to take a predetermined action. The predetermined action may be, for example, calling a phone number for Business A, requesting navigational information to Business A, or visiting another website such as a site for Business A. The informational section 120 may also include text 128, such as a listing of the operating hours of Business A.

The popular times section 130 includes a graphic representation of how popular the requested location is throughout the day and the week. In this example, a popular times histogram 131 for the current day is shown, the user may select another day 132 to view histograms for other days. In this example, typical levels of busyness are indicated by unshaded bars 133, while the current level of busyness, in real-time, is indicated by a shaded bar 134. In this example, the day is broken down on an hourly basis. The expected wait time 135 for the current hour is displayed as a text above the popular times histogram 131. Below the popular times histogram 131, the maximum expected wait time 136 for the current day, along with the corresponding peak interval, is shown as a text. The user can click on the popular times histogram 131 to see the expected wait time for a different hour, and by selecting a different day to view on the popular times section 130, can view the expected wait times for a different day. Moreover, the timeline 137 may correspond to a range of hours that Business A is in operation.

While a number of example sections are described above in connection with FIG. 1, and the expected wait time information is shown as a text, it should be understood that these are merely examples. The expected wait time information may be provided for display in any of a number of ways, such as text, pictorial diagrams, charts, graphs, etc. In other examples, the expected wait time information may be provided to other applications, such as scheduling applications, ride-service applications, games, or any of a variety of other applications.

Figure 2:
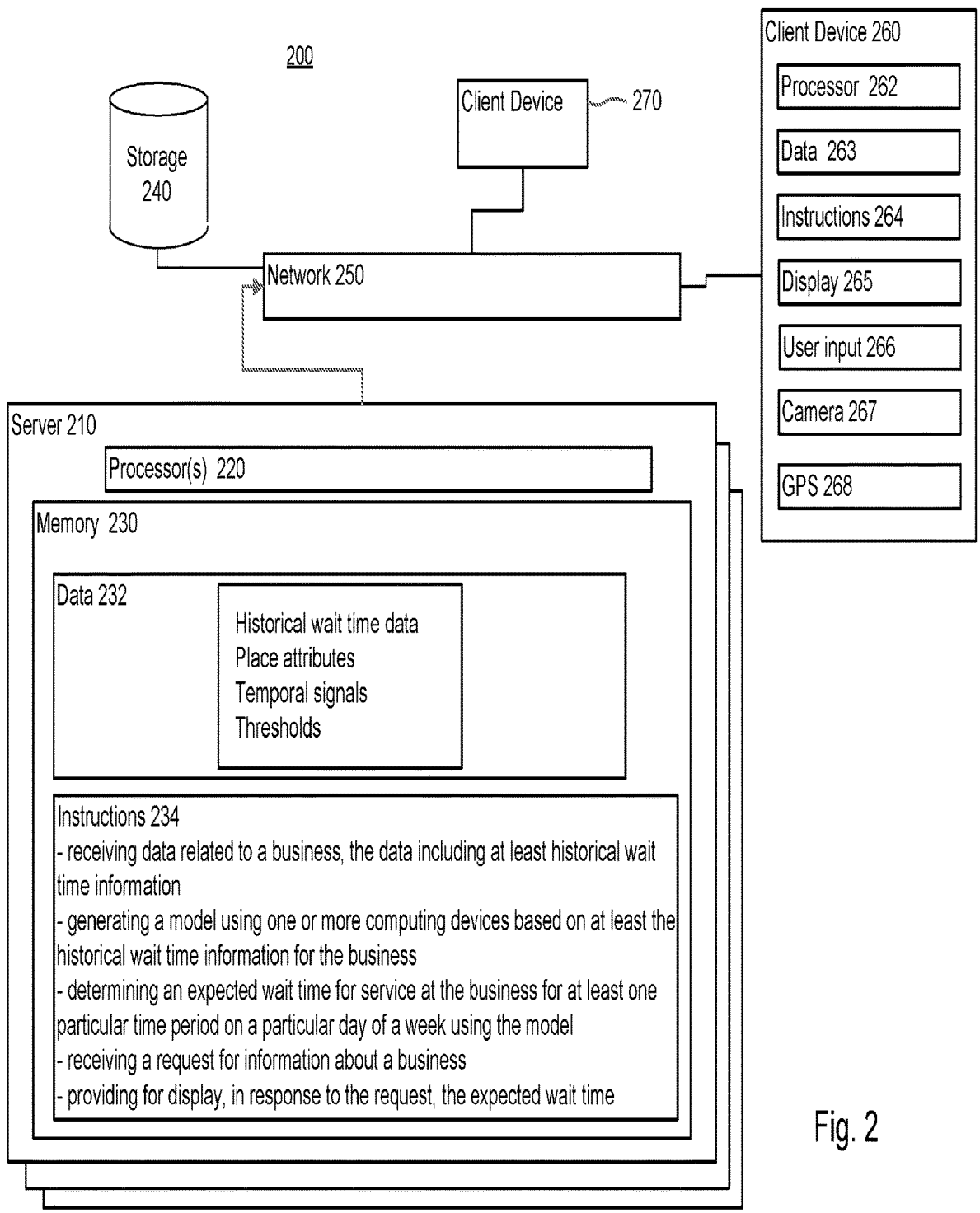
FIG. 2 is a block diagram illustrating an example system for predicting wait times according to aspects of the disclosure.

FIG. 2 illustrates an example system used to receive data related to a business, generate a wait time prediction model, determine expected wait times using the generated model, and provide the expected wait times for display upon user request. It should not be considered as limiting the scope of the disclosure or usefulness of the features described herein. In this example, system 200 can include computing devices 210 in communication with one or more computing devices 260, 270, as well as storage system 240, through network 250. Each of the computing devices 210 contains one or more processors 220, memory 230 and other components typically present in general purpose computing devices. Memory 230 of each of the computing devices 210 can store information accessible by the one or more processors 220, including instructions 234 that can be executed by the one or more processors 220.

Memory 230 can also include data 232 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 232 may be retrieved, stored, or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, propriety codes, pointers, references to data stored in other memories such as at other network locations, or information that is used by a function to calculate the relevant data.

The one or more processors 220 can be any conventional processors, such as a commercially available CPU. Alternatively, the processors can be dedicated components such as an application specific integrated circuit ("ASIC") or other hardware-based processor. Although not necessary, one or more of the computing devices 210 may include specialized hardware components to perform specific computing processes, such as decoding video, matching video frames with images, distorting videos, encoding distorted videos, etc. faster or more efficiently.

Although FIG. 2 functionally illustrates the processor, memory, and other elements of computing devices 210 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 210. Accordingly, references to a processor, computer, computing device, or memory will be understood to include references to a collection of processors, computers, computing devices, or memories that may or may not operate in parallel. For example, the computing devices 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 250.

Each of the computing devices 210, 260, 270 can be at different nodes of a network 250 and capable of directly and indirectly communicating with other nodes of network 250. Although only a few computing devices are depicted in FIG. 2, it should be appreciated that a typical system can include a large number of connected computing devices, with each different computing device being at a different node of the network 250. The network 250 and intervening nodes described herein can be interconnected using various protocols and systems, such that the network can be part of the Internet, World Wide Web, specific intranets, wide area networks, or local networks. The network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 210 may include web servers capable of communicating with storage system 240 as well as computing devices 260, 270 via the network 250. For example, one or more of server computing devices 210 may use network 250 to transmit and present information to a user on a display, such as display 265 of computing device 260. In this regard, computing devices 260, 270 may be considered client computing devices and may perform all or some of the features described herein.

Each of the client computing devices 260, 270 may be configured similarly to the server computing devices 210, with one or more processors, memory and instructions as described above. Each of the client computing devices 260, 270 may be a personal computing device intended for use by a user, and have all of the components normally used in connection with a personal computing device such as a central processing unit (CPU) 262, memory (e.g., RAM and internal hard drives) storing data 263 and instructions 264, a display such as display 265 (e.g., a monitor having a screen, a touch-screen, a projector, a television, or other device that is operable to display information), and user input device 266 (e.g., a mouse, keyboard, touch-screen, or microphone). The client computing device may also include a camera 267 for recording video streams and/or capturing images, speakers, a network interface device, and all of the components used for connecting these elements to one another. The client computing device 260 may also include a location determination system, such as a GPS 268. Other examples of location determination systems may determine location based on wireless access signal strength, images of geographic objects such as landmarks, semantic indicators such as light or noise level, etc.

Although the client computing devices 260, 270 may each comprise a full-sized personal computing device, they may alternatively comprise mobile computing devices capable of wirelessly exchanging data with a server over a network such as the Internet. By way of example only, client computing device 260 may be a mobile phone or a device such as a wireless-enabled PDA, a tablet PC, a netbook, a smart watch, a head-mounted computing system, or any other device that is capable of obtaining information via the Internet. As an example the user may input information using a small keyboard, a keypad, microphone, using visual signals with a camera, or a touch screen.

As with memory 230, storage system 240 can be of any type of computerized storage capable of storing information accessible by the server computing devices 210, such as a hard-drive, memory card, ROM, RAM, DVD, CD-ROM, write-capable, and read-only memories. In addition, storage system 240 may include a distributed storage system where data is stored on a plurality of different storage devices which may be physically located at the same or different geographic locations. Storage system 240 may be connected to the computing devices via the network 250 as shown in FIG. 1 and/or may be directly connected to any of the computing devices 210.

Storage system 240 may store data, such as historical wait time information for particular businesses, place attributes, historical temporal signals, thresholds, etc. For example, the historical wait time information for a popular business for a past number of months or years may be stored.

Using the stored data, the computing devices 210 may generate a wait time prediction model for a business and use the model to determine expected wait times at various time periods of a day throughout a week for the business. The computing devices 210 may also receive requests from users' client computing devices 260, 270 about the business and in response, provide for display on the client computing devices 260, 270 the expected wait time at the business.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 3:
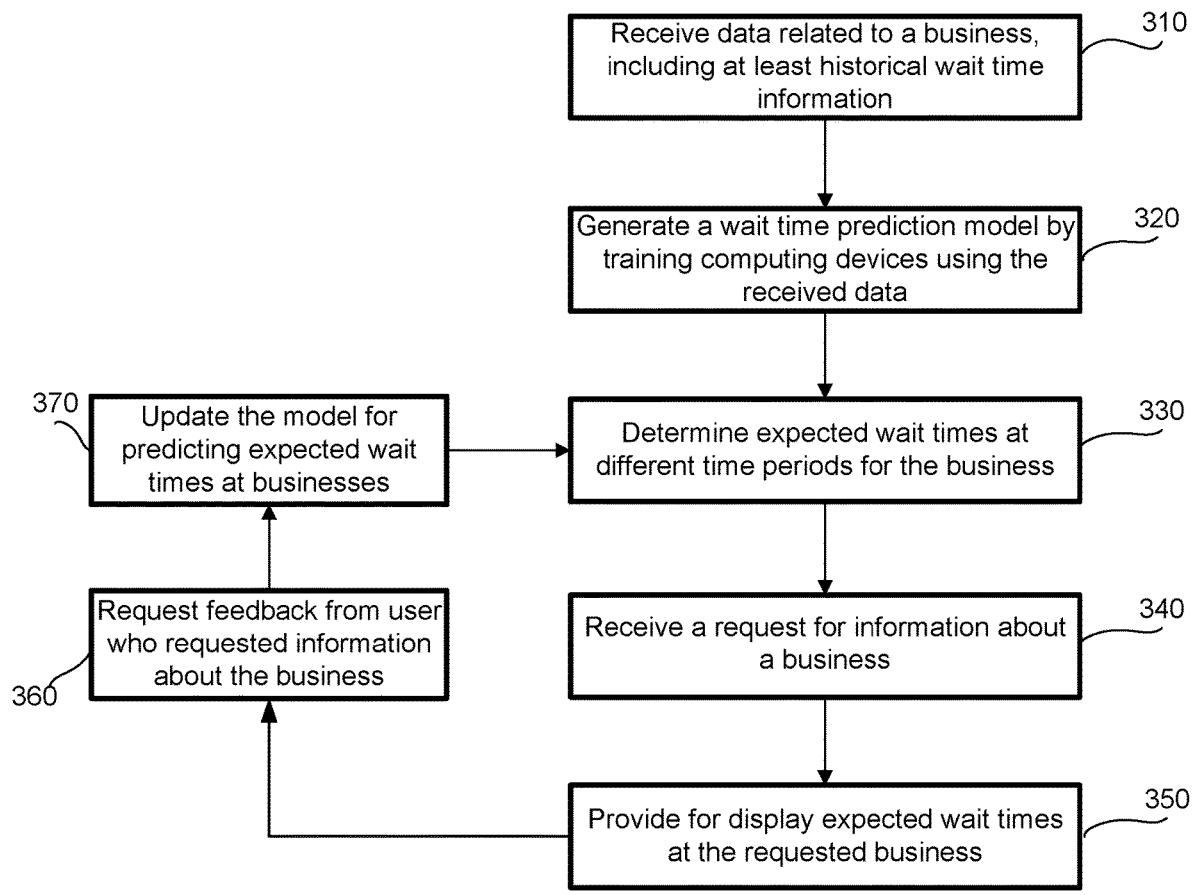
FIG. 3 is a flow diagram illustrating an example method of generating a wait time prediction model, determining expected wait times using the model, and providing the expected wait times for display in accordance with aspects of the disclosure.

FIG. 3 illustrates an example method 300 of receiving data related to a business, generating a wait time prediction model, determining expected wait times using the model, and providing the expected wait times for display in response to a request.

In block 310, data related to a business is received. The data may be collected in a number of ways, for example, from databases, from the businesses themselves, from user reports, from real-time measurements, etc. Example data may include the historical wait times experienced at the business at various times of the day, and on different days of the week. The data may also include place attributes, i.e., information about the business, such as the category of the business, reservation information, whether there is usually a wait, online visit statistics, and user ratings and reviews, etc. The data may further include historical temporal signals such as the number of arrivals, number of departures, occupancy level, and duration of visit at different times. The data may also include signals that are derived from such historical temporal signals, for example, a maximum, a minimum, a mean, a sum, a percentile, etc. The data may yet further include lag variables of the historical temporal signals and derived temporal signals. Examples of the data received are described in more detail in FIG. 4.

In block 320, a model is generated by training computing devices to learn patterns from the received data. For example, a deep neural network with a custom loss function may be trained with the received data to generate a quantile regression model by minimizing the loss function. For example, the neural network may have two fully connected hidden layers, each with tens or hundreds of neurons. Any of a variety of different types of models may be used, for example, the model may be a regression model or a classification model. The model may also be a linear model, a boosting tree model, a random forest model, or a neural net model. One example of generating a model is described in more detail in FIG. 4.

In block 330, the expected wait time is determined using the model generated in block 310. For example, when various place attributes and historical temporal signals about a business without known historical wait times are given to the generated model, expected wait times may be computed for the business using the model.

The determining may also include finding an upper bound expected wait time. The determining may further include determining whether the expected wait time is below a predetermined significant-wait threshold. The determining may also include computing the maximum expected wait time for the day. The determining may yet further include smoothing the expected wait time using weighted averages. One example of determining the expected wait time is described in more detail in FIG. 5 and FIG. 6.

In block 340, a request is received from a user for information on the business. For example, an example request could be an online search for a particular business, a map search for a particular business, a general search for a category of businesses nearby, or the like.

In block 350, the expected wait time is provided for display to the requesting user. The providing for display step may include, for example, providing for display the wait time as an upper bound, providing for display a time period as "no wait" if the expected wait time is below a significant-wait threshold, providing for display the maximum wait time of the day and the corresponding peak intervals, providing for display feedback options, and providing for display expected wait time information in association with other busyness information. The expected wait time information may be provided for display in any of a number of ways, such as text, pictorial diagrams, charts, graphs, etc. In other examples, the expected wait time information may be provided to other applications, such as scheduling applications, ride-service applications, games, or any of a variety of other applications. Some example displays are described in more detail in FIG. 7.

In block 360, feedback is requested from the user who requested information on the business. A request for feedback may include, for example, confirmation of whether the displayed expected wait times are consistent with the user's experienced wait time. One example of requesting for feedback is described in more detail in FIG. 7.

In block 370, the model is updated using new information received from user feedback. Such new information may be newly experienced wait times, new reservation information, new arrival count at a certain hour, etc. The new information may be used to refresh the training data for generating the model. One example of updating the model is described in more detail in FIG. 4.

Figure 4:
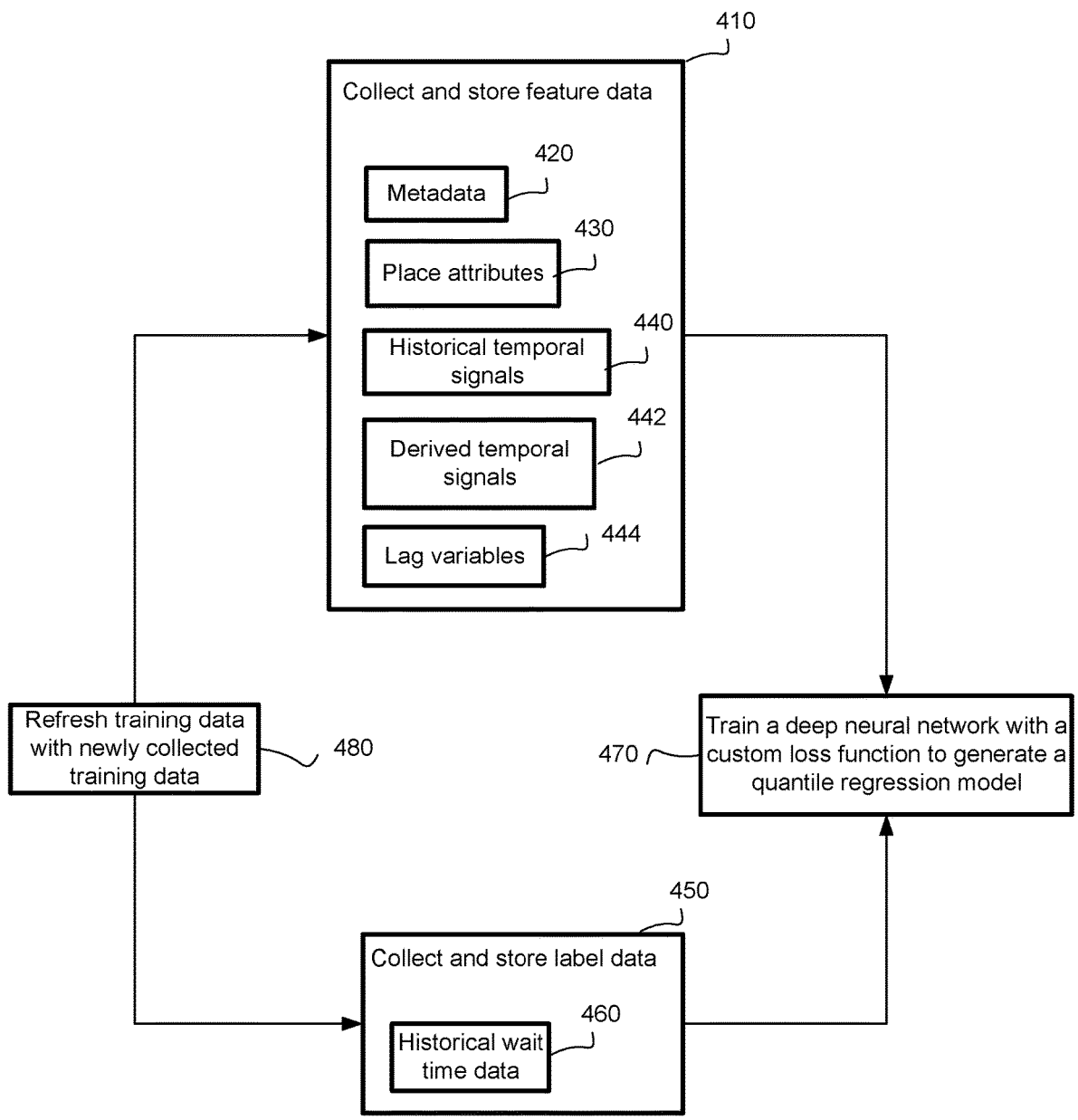
FIG. 4 is a flow diagram illustrating an example method of generating a wait time prediction model by training computing devices to learn a pattern from various training data in accordance with aspects of the disclosure.

FIG. 4 illustrates in more detail an example method 400 for generating a wait time prediction model. For example, some of the steps in the method 400 may correspond to blocks 310, 320, and 370.

Block 410, example features for generating the model are collected and stored. The data may be collected in a number of ways, for example, from databases, from the businesses themselves, from user reports, etc. Block 420 shows that metadata may be an example feature data that is collected and stored. For example, the metadata could include the time period of the day and the day of the week. In this example, a week is divided into 648 equal time periods, each 30 minutes in length, e.g., Monday 8 am-8:30 am, Monday 8:30 am-9 am, . . . , Sunday 9:30 pm-10 pm, etc. Additionally, the metadata may also include the amount of time since the first opening hour of the business, and the amount of time until the last opening hour of the business.

Block 430 shows that place attributes about the business may also be an example feature data that is collected and stored. The data may be collected in a number of ways, for example, from databases, from the businesses themselves, from user reports, etc. Some example place attributes may include the category of the business, number of online visits, reservation information, user review information, etc. The categories could be general, e.g., restaurant, store, hospital, government, etc.; or they could be more nuanced, e.g., fine-dining, fast food, bar, coffee shop, grocery store, department store, clinic, urgent care, post office, DMV, etc. The place attributes may also include online visit statistics, such as number of times an ad about the business is shown as a result of a search, number of online searches about the business, number of online visits of the business's website, number of map searches, etc. The place attributes may additionally include reservation information, such as whether the place accepts reservations, whether it recommends reservations at certain times. User review and rating information may also be place attributes, such as the number of reviewers, the number of comments, the average rating, the number of ratings, etc. Yet another example place attribute is whether the business is known to usually have a wait.

Block 440 shows that historical temporal signals may be another example feature data that is collected and stored. Historical temporal signals are signals that may fluctuate throughout a day and throughout a week, therefore, they are collected for each (p, t) tuple, where p is the identifier of the place or the business, and t is the time period for which an expected wait time is to be determined. The look-back window represents the number of data points collected for each (p, t) tuple. For example, if the look-back window is 24 weeks, then there would be 24 data points for each (p, t) tuple. In other words, this means that for Business A at the 8 pm-8:30 pm time period, there are 24 arrival counts recorded over these 24 weeks. The look-back window can be tailored such that a representative amount of historical temporal signals are available, yet not look so far back such that there may have been significant changes in the wait time pattern for the business.

Example historical temporal signals include an arrival count, a departure count, an occupancy level, and durations of visits that started in the time period t. The duration of visit data may be the mean duration, the $10^{th}$ percentile duration, the $90^{th}$ percentile duration, or the like. Historical temporal signals may also include online behavioral signals, such as the number of times an ad about the business is shown as a result of a search, the number of online searches about the business, the number of online visits of the business's website, the number of map searches, etc.

Block 442 shows that derived temporal signals may be yet another example feature data that is collected and stored. For example, a maximum, a minimum, a mean, and a sum of the number of arrivals at a particular time period on a particular day of a week for a business, i.e., a (p, t) tuple, can be computed over the entire look-back window. The same set of statistics can be computed for each of the historical temporal signals described above in relation to block 440. As another example, aggregated data such as the $10^{th}$ percentile and $90^{th}$ percentile visit durations for a (p, t) tuple can be computed over the entire look-back window. Instead of using the entire look-back window, alternatively one may also compute derived temporal signals over only part of the look-back window.

Block 444 shows that lag variables, yet another example of derived temporal signals, may also be a feature data that is collected and stored. Lag variables may be determined for each of the historical temporal and derived temporal signals shown in blocks 440 and 442. A lag variable may be backward-looking or forward-looking. For example, one interesting backward-looking lag variable may be the number of arrivals in an earlier time period of the day, such as in the time period t−1 preceding the time period t for which an expected wait time is to be predicted, since these recent arrivals are likely to remain beyond the time period t. As another example, one interesting forward-looking lag variable may be the occupancy level in a later time period of the day, such as in the upcoming time period t+1 following the time period t for which an expected wait time is to be predicted. For instance, if the following hour corresponds to the end of lunch break for many employees in the area, a large number of departures may be expected in the upcoming hour, and therefore the business will soon be able to absorb more customers in the upcoming hour.

In block 450, example labels for generating the model are collected and stored. Block 460 shows that historical wait time data may be an example label data that is collected and stored. The historical wait time data may be collected from consumer surveys. For example, the survey may ask a user to input the actual wait time experienced, or it may ask a user to choose from a list of estimates, e.g., 0 min, 5 min, 10 min, . . . , 30 min, 60 min, more than 60 min, etc. The survey may also ask the user at what time and day the wait time was experienced. The survey may additionally ask the user whether service was eventually received at the business. Additionally, the survey may ask more nuanced questions such as whether a reservation was made, was it dine in or take out, etc. To ensure that the received wait time data are accurate, the surveys are preferably sent to the user soon after the visit. The method is not limited to using surveys, for example, the actual wait time data may be collected from another database, from the businesses, or from real-time measurements, etc.

The historical wait time data collected are sorted and stored for each (p, t) tuple. For example, if a wait time is collected for a visit to Business A at 5:13 pm on Monday, it will be sorted as a wait time for Business A, Monday 5 pm-5:30 pm.

In block 470, a deep neural network with a custom loss function is trained with the example features collected and stored in block 410 and the example labels collected and stored in block 450. For example, the neural network may have two fully connected hidden layers, each with tens or hundreds of neurons. In this example, the deep neural network learns patterns from the feature data and label data and generates a quantile regression model by minimizing the loss function. In this example, the quantile regression model predicts an expected wait time as a value at a predetermined quantile, specifically, the $90^{th}$ percentile expected wait time.

However, the method 400 is not limited to training a neural network to generate a quantile regression model. Various types of models may be generated using the method 400. For example, the model may be a regression model or a classification model. The model may also be a linear model, a boosting tree model, a random forest model, or a neural net model, etc.

In block 480, the training data are refreshed with feedback collected from users. For example, the user who requested the wait time information may provide feedback about the accuracy of the expected wait time, or input a new wait time actually experienced by the user. The feedback may include additional options such as leave a review or a rating, or provide more information about the business. Feedback may additionally be collected via other methods and from other sources other than the requesting user, for example, they could be collected from new customer surveys, databases, etc.

For example, the feedback may include a newly experienced actual wait time, which becomes an additional set of label data that can be used to refine and update the current model. The feedback may also include new information that a user provides about the business, for example, that the place recommends reservations for lunch. Therefore, the current model may be updated with the new place attribute about reservations. The feedback may also include a new duration of visit that the user reports, which can be used to update the historical temporal signals. The model may be updated each time a new feedback is collected, or alternatively and more practically, for example, at some regular time interval, whenever a predetermined number of new feedbacks are collected, or whenever a new place attribute needs to be updated, etc.

Figure 5:
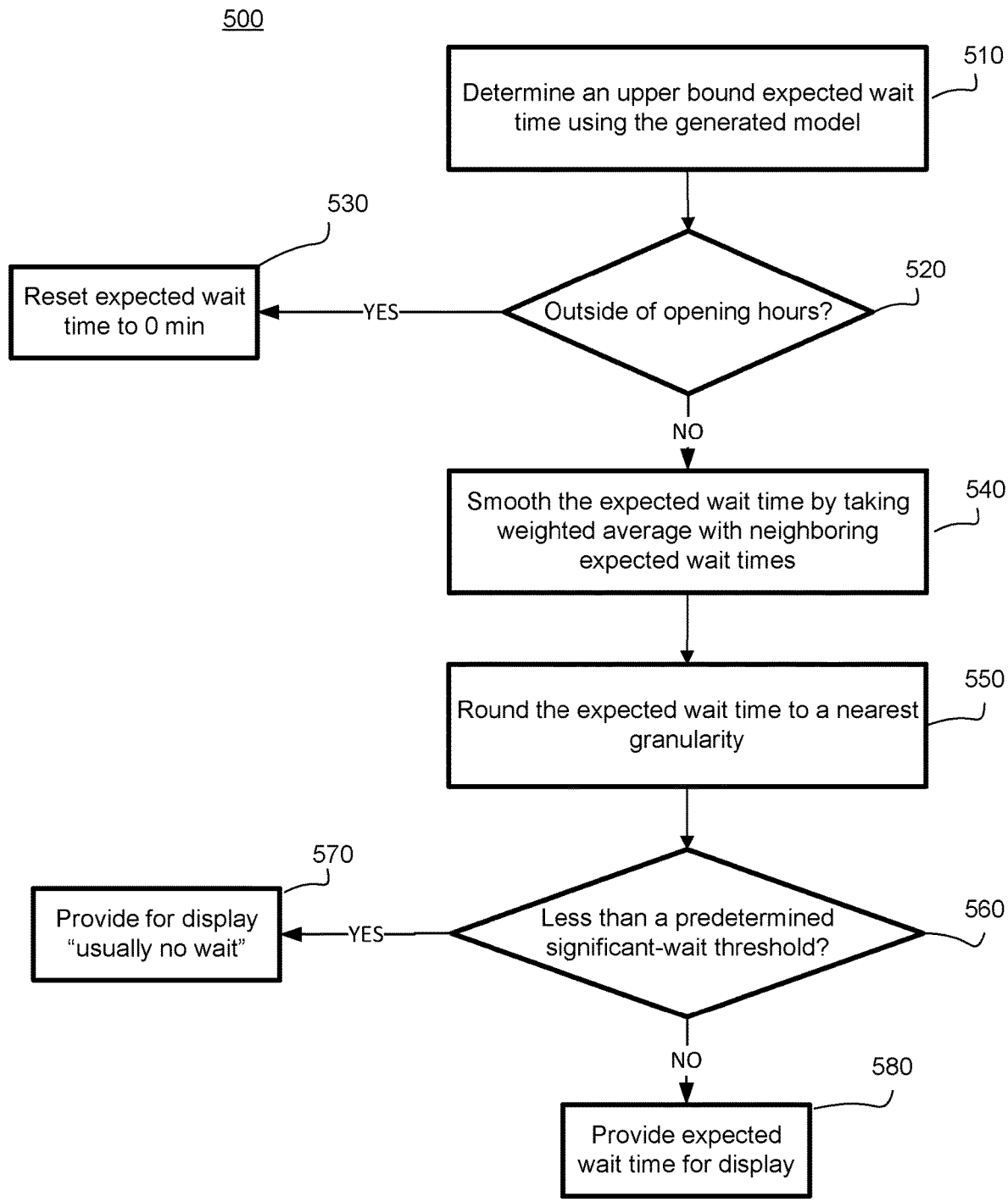
FIG. 5 is another flow diagram illustrating an example of optimizing the predicted wait time for display according to aspects of the disclosure.

FIG. 5 illustrates in more detail an example method 500 for determining an expected wait time using the model generated from the method 400 and providing for display. For example, some of the steps in the method 500 may correspond to blocks 330 and 350.

Block 510 shows that an upper bound expected wait time is determined using the model generated from method 400. An upper bound expected wait time may be more useful for decision making than, for example, a lower bound or the mean expected wait time, since a user may have limited availability, e.g., lunch hour ends. Instead of the absolute upper bound, one preferred example determines the $90^{th}$ percentile expected wait time. Alternatively, the upper bound could be the $70^{th}$ percentile expected wait time, and so on. The method is not limited to expressing the expected wait time as an upper bound, for example, the expected wait time may also be expressed as a range of typically expected wait times or the most likely expected wait time.

In block 520, it is determined whether the expected wait time is for a time period outside of opening hours, and if so, the expected wait time is reset as 0 min (block 530).

In block 540, the wait time is smoothed by taking a weighted average of the expected wait time and at least one other expected wait time from a neighboring time period. For example, if the expected wait time for Friday 5 pm-5:30 pm is 20 min, for 5:30 pm-6 pm is 55 min, and for 6 pm-6:30 pm is 70 min, then an example weighted average for the 5:30 pm-6 pm time period may be (0.5×20 min+1×55 min+0.5× 70 min)/2=50 min. Expected wait times outside of the opening hours are not used in calculating weighted averages.

In block 550, the expected wait time is rounded to a predetermined granularity. For example, if granularity is set at 15 min, "up to 30 min wait" and "up to 45 min wait" may be provided for display instead of "up to 28 min wait" and "up to 40 min wait." Continuing from the example above for the time period Friday 5:30 pm-6 pm, the expected wait time of 50 min may be rounded to 45 min.

In block 560, the expected wait time is compared to a significant-wait threshold. In many cases, a certain threshold of wait time is almost always expected for a category of businesses. For example, a person walking into almost any sit-down restaurant without a reservation could expect at least some wait before seated, say, 10 min. Thus, it would not be interesting for a user to see such trivial wait times. Since upper bound expected wait times are determined in this example, a significant-wait threshold of 30 min may be preferable. Therefore, continuing from the examples above, for Friday 5 pm-5:30 pm the expected wait time is less than 30 min, so "usually no wait" will be provided for display (block 570) for Friday 5 pm-5:30 pm. For Friday 5:30 pm-6 pm in the example above, the expected wait time is greater than 30 min, therefore "up to 45 min wait" will be provided for display (block 580) for Friday 5:30 pm-6 pm.

Figure 6:
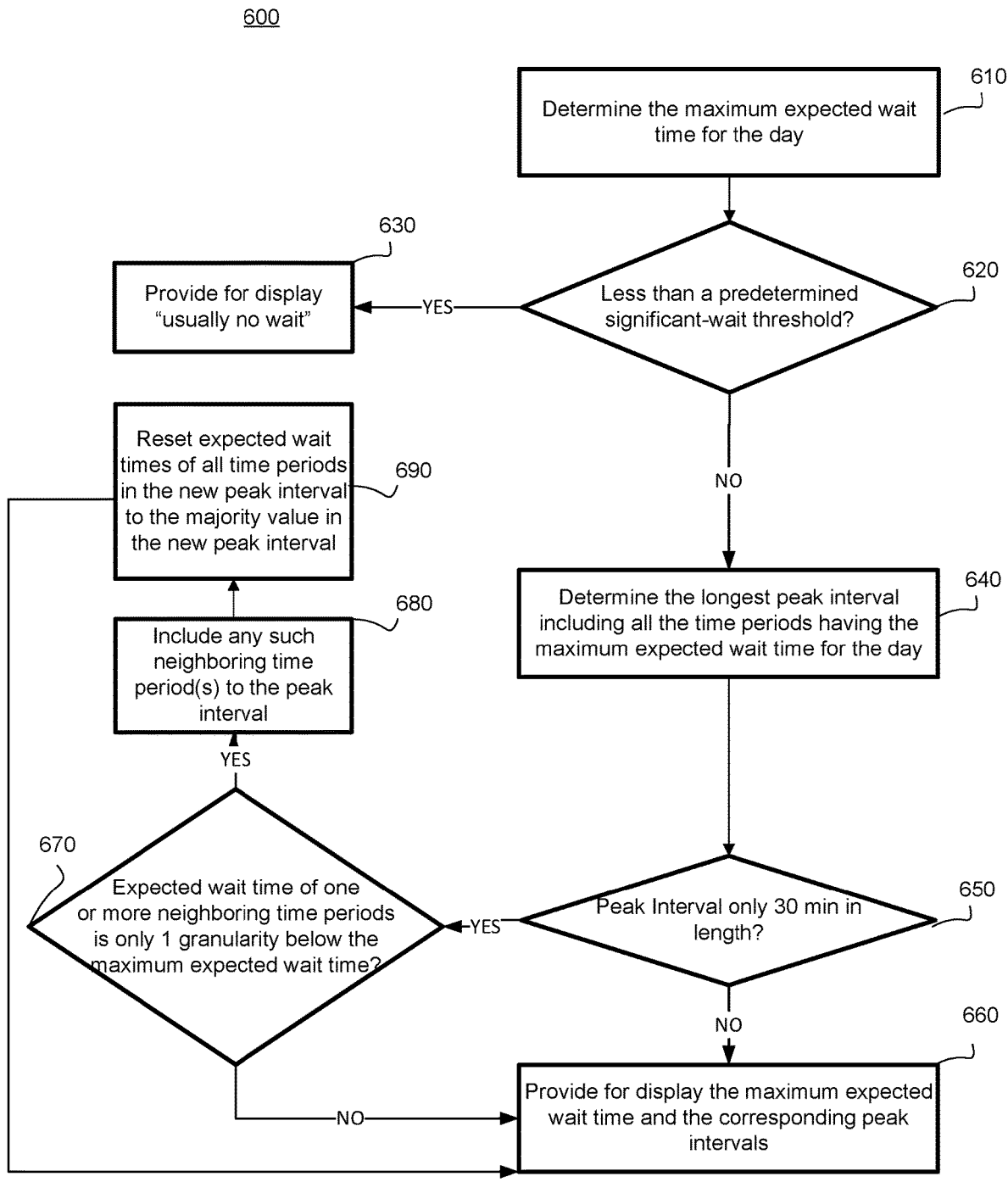
FIG. 6 is another flow diagram illustrating an example method for determining a maximum expected wait time providing the maximum expected wait time for display according to aspects of the disclosure.

FIG. 6 illustrates in more detail an example method 600 for determining a maximum expected wait time using the model generated from the example method 400 and providing the maximum expected wait time for display. For example, some of the steps in the method 600 may correspond to blocks 330 and 350.

In block 610, a maximum expected wait time for the day is determined among all the expected wait times available for the day.

In block 620, it is determined whether the maximum expected wait time of the day is less than the predetermined significant-wait threshold. If so, "usually no wait" is provided for display for the day 630. For example, if the significant-wait threshold is set at 30 min and the maximum wait time of the day is 15 min, "usually no wait" would be provided for display; otherwise, the method carries on to determine the peak interval corresponding to the maximum expected wait time. In this example, the threshold for determining whether there is a significant wait for a particular time period is the same as the threshold for determining whether there is a significant wait for a day; however, alternatively, two different thresholds can be set.

In block 640, the peak interval corresponding to the maximum expected wait time is determined. In this example, it is the longest interval including all the time periods that have the maximum expected wait time for the day. For example, if Friday from 7 pm-8:30 pm, the expected wait time is at maximum for the day at 90 min, then 7 pm-8:30 pm would be the peak interval for Friday, which includes all three time periods 7 pm-7:30 pm, 7:30 pm-8 pm, and 8 pm-8:30 pm. The method may determine multiple peak intervals for a given day.

In block 650, it is determined whether the peak interval is only 30 min in length. If the peak interval is greater than 30 min in length, as in the example above, the maximum expected wait time along with the corresponding peak interval will be provided for display (block 660). If the peak interval is only 30 min in length, it is determined whether any of its neighbors have an expected wait time that is only one granularity less than the maximum expected wait time (block 670). If so, such neighbors will be included in the peak interval (block 680) and the expected wait time of the entire peak interval will be reset to the majority value of the peak interval (block 690). For example, if Thursday 7 pm-7:30 pm has the maximum expected wait time of 45 min and it is the longest interval for this maximum expected wait time, then the peak interval is only 30 min in length. However, the expected wait time is 30 min for both 6:30 pm-7 pm and at 7:30 pm-8 pm on Thursday. Since the granularity is set at 15 min, the expected wait times for both 6:30 pm-7 pm and 7:30 pm-8 pm are only one granularity below the maximum expected wait time of 45 min Therefore, the new peak interval will be 6:30 pm-8 pm on Thursday, and the expected wait time for this new peak interval will be the majority value of 30 min. In this way, instead of showing a very short peak interval of 30 min for Thursday having an expected wait of 45 min, it may be better to show the user a broader peak interval that may be more representative of the peak, since the two time periods around 7 pm-7:30 pm are not much different.

Figure 7:
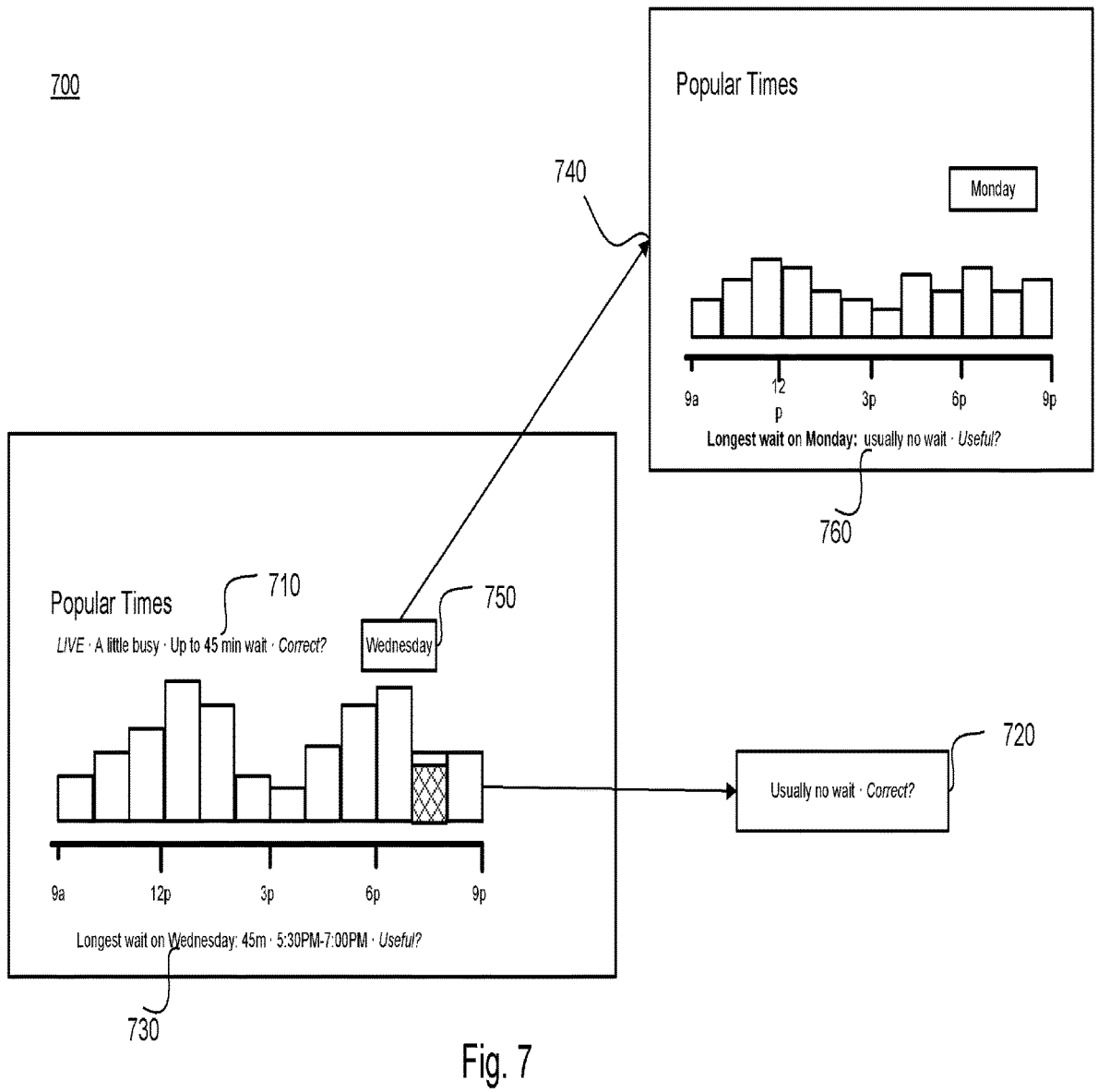
FIG. 7 illustrates example displays of expected wait time information according to aspects of the disclosure.

FIG. 7 illustrates example displays 700 of the expected wait time data. In this example, the current expected wait time data is displayed along with the popular times data, including real-time busyness data. In this example, a user sent a request for information about the business at 7:12 pm on a Wednesday, therefore the expected wait time 710 for the time period 7 pm-7:30 pm on a Wednesday is shown. The expected wait time 710 is expressed as an upper bound, "up to 45 min wait." The text "Correct?" links the requesting user to a feedback form, where the user may provide feedback about whether the information is accurate, an actually experienced wait time, additional information about the business, or other information related to the user's visit.

Pop-up 720 shows that, when the user clicks on the bar representing the time period 8 pm-9 pm on Wednesday, the higher expected wait time between the two time periods 8 pm-8:30 pm and 8:30 pm-9 pm is displayed. In this example, the expected wait time for 8 pm-8:30 pm is 15 min and the expected wait time for 8:30 pm-9 pm is 0 min. Therefore, the expected wait time for the time period 8 pm-9 pm on Wednesday is expressed as "usually no wait" since both values are below the predetermined significant-wait threshold. In this example, the threshold is set at 30 minutes.

Below the popular times histogram, a maximum expected wait time 730 for the current day is displayed along with the corresponding peak time interval. In this example, the maximum expected wait time 730 for Wednesday is displayed as "longest wait today 45 min 5:30 pm-7 pm." The text "Useful?" links the user to a feedback form, where the user may provide feedback about whether the information is accurate, provide an actually experienced wait time, additional information about the business, or other information related to the user's visit.

Pop-up 740 shows that, when the user changes the date on the dropdown menu for dates 750 to Monday, the expected wait time information for Monday is displayed. In this example, Monday's maximum expected wait time 760 is expressed as "usually no wait" because there is no time period on Monday with an expected wait time equal or above the predetermined significant-wait threshold, which is set at 30 minutes in this example.

Although not shown here, if the business accepts or recommends making reservations at particular times or on particular days, and the expected wait times during these times or days are below the predetermined significant-wait threshold, it may simply be that most of the visitors make reservations to the business during such times and days, and therefore that was the reason for usually no wait. In such cases, though not shown in FIG. 7, the method may provide for display "recommend reservations" instead of "usually no wait," as the latter may be misleading.

It should be understood that the examples of how the predicted wait times are displayed are not limiting, and that the information may be displayed in any of a variety of other formats. For example, the expected wait time information may be provided for display as text, pictorial diagrams, charts, graphs, etc. In other examples, the expected wait time information may be provided to other applications, such as scheduling applications, ride-service applications, games, or any of a variety of other applications.

The wait time prediction technology described herein is advantageous in a number of ways. For example, the technology may be developed for a large scale of businesses and public service establishments, and therefore can be relied on by users in making many everyday decisions. Further, because a larger amount of historical data may be collected as compared to requesting users currently visiting a business for real-time data, the predicted wait times will be less affected by outliers and more indicative of a trend. Still further, because the wait time prediction model can be refined and refreshed with newly collected data, the wait time prediction technology can be updated to reflect a recent change in trend. The data used to build the wait time prediction model may be large in volume, but the users are presented with useful information that is simple to understand. Therefore, after a quick glance, users will be aided in their decision making.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A method for providing wait times, comprising:
receiving, by one or more computing devices, historical wait time information for a plurality of businesses corresponding to a set of time periods;
receiving, by the one or more computing devices, place attributes for the plurality of businesses, the place attributes comprising a place category, a number of online visits, reservation information, and user review information;
generating, by the one or more computing devices, one or more lag variables corresponding to the set of time periods using historical temporal signals, wherein each lag variable corresponding to a given one of the time periods is generated based on a given historical temporal signal corresponding to a different one of the time periods;
generating, by the one or more computing devices, a model for predicting expected wait times by inputting feature data and label data to the model, and training the model based on the feature data and the label data, wherein the feature data includes the place attributes; and the lag variable, and the label data includes the historical wait time information;
receiving, by the one or more computing devices, a user request for information about a given business;
determining, by the one or more computing devices using the trained model, an expected wait time for the given business for a plurality of time periods during business hours;
computing, by the one or more computing devices, a maximum expected wait time for a particular day of the week for the given business;
determining, by the one or more computing devices, at least one peak interval for the particular day of the week for the given business, the peak interval comprising one or more time periods having the maximum expected wait time;
and
providing for display, by the one or more computing devices in response to the user request, the expected wait time for the plurality of time periods during business hours, the at least one peak interval, and current level of busyness in real time for the given business.

2. The method according to claim 1, wherein the set of time periods are time periods making up a week, and the historical temporal signals for each of the set of time periods is collected for a predetermined look-back window over a plurality of weeks.

3. The method according to claim 2, further comprising:
generating, by the one or more computing devices based on the historical temporal signals, derived temporal signals computed over at least a part of the predetermined look-back window.

4. The method according to claim 1, wherein the lag variables comprise at least one backward-looking lag variable, the backward-looking lag variable being one of the historical temporal signals corresponding to an earlier time period of the set of time periods.

5. The method according to claim 1, wherein the lag variables comprise at least one forward-looking lag variable, the forward-looking lag variable being one of the historical temporal signals corresponding to a later time period of the set of time periods.

6. The method according to claim 1, wherein the model is trained to generate the expected wait time as an upper bound expected wait time.

7. The method according to claim 1, further comprising:
determining, by the one or more computing devices, whether the expected wait time is less than a predetermined significant-wait threshold; and
displaying, by the one or more computing devices, a no-wait time period if the expected wait time is less than the predetermined significant-wait threshold.

8. The method according to claim 2, further comprising:
displaying, by the one or more computing devices, the maximum expected wait time.

9. The method according to claim 1, wherein the model is trained to apply smoothing to the expected wait time by taking a weighted average of the expected wait time and at least one other expected wait time from a neighboring time period of the set of time periods.

10. The method according to claim 1, further comprising:
providing for display, by the one or more computing devices, additional business information indicating busyness level corresponding to at least one of the set of time periods for the given business.

11. The method according to claim 1, further comprising:
requesting, by the one or more computing devices, user feedback regarding accuracy of the expected wait time;
receiving, by the one or more computing devices in response to the request, the user feedback; and updating, by the one or more computing devices, the model by training the model further based on the user feedback.

12. The method according to claim 1, further comprising:
receiving, by the one or more computing devices, new wait time information;
refreshing, by the one or more computing devices, the model by training the model using the new wait times as additional label data.

13. The method according to claim 1, wherein the model is one of a regression model or a classification model.

14. The method according to claim 13, wherein the model is a quantile regression model configured to generate the expected wait time as a value at a predetermined quantile.

15. The method according to claim 1, wherein the model is one of a linear model, a boosting tree model, a random forest model, or a neural net model.

16. A system for providing wait times, comprising:
a memory; and
one or more processor in communication with the memory, the one or more processors configured to:
receive historical wait time information for a plurality of businesses corresponding to a set of time periods;
receive place attributes for the plurality of businesses, the place attributes comprising a place category, a number of online visits, reservation information, and user review information;
generating one or more lag variables corresponding to the set of time periods using historical temporal signals, wherein each lag variable corresponding to a given one of the time periods is generated based on a given historical temporal signal corresponding to a different one of the time periods;
generate a model for predicting expected wait times by inputting feature data to the model and label data, and training the model based on the feature data and the label data, wherein the feature data includes the place attributes and the lag variable, and the label data includes the historical wait time information;
receive a user request for information about a given business;
determine, using the trained model, an expected wait time for the given business for plurality of time periods during business hours;
compute a maximum expected wait time for a particular day of the week for the given business;
determine at least one peak interval for the particular day of the week for the given business, the peak interval comprising one or more time periods having the maximum expected wait time; and
provide for display, in response to the user request, the expected wait time for the plurality of time periods during business hours, the at least one peak interval, and current level of busyness in real time for the given business.

17. The system according to claim 16, wherein the set of time periods are time periods making up a week, and the historical temporal signals for each of the set of time periods is collected for a predetermined look-back window over a plurality of weeks.

18. A non-transitory computer-readable storage medium storing instructions executable by one or more processors for performing a method of providing wait times, comprising:
receiving historical wait time information for a plurality of businesses corresponding to a set of time periods;
receiving place attributes for the plurality of businesses, the place attributes comprising a place category, a number of online visits, reservation information, and user review information;
generating one or more lag variables corresponding to the set of time periods using historical temporal signals, wherein each lag variable corresponding to a given one of the time periods is generated based on a given historical temporal signal corresponding to a different one of the time periods;
generating a model for predicting expected wait times by inputting feature data and label data to the model, and training the model based on the feature data and the label data, wherein the feature data includes the place attributes and the lag variable, and the label data includes the historical wait time information;
receiving a user request for information about a given business;
determining, using the trained model, an expected wait time for the given business for plurality of time periods during business hours;
computing a maximum expected wait time for a particular day of the week for the given business;
determining at least one peak interval for the particular day of the week for the given business, the peak interval comprising one or more time periods having the maximum expected wait time; and
providing for display, in response to the user request, the expected wait time for the plurality of time periods during business hours, the at least one peak interval, and current level of busyness in real time for the given business.

19. The method of claim 1, wherein the plurality of time periods during business hours are presented in hour intervals.

20. The system of claim 16, wherein the plurality of time periods during business hours are presented in hour intervals.

* * * * *